United States Patent
Dillen et al.

(10) Patent No.: US 7,866,091 B2
(45) Date of Patent: Jan. 11, 2011

(54) BREEDING PLANTS

(75) Inventors: Willy Dillen, Sint-Amandsberg (BE); Pierre Lejeune, Dolembreux (BE); Willem Broekaert, Dilbeek (BE); Frederik Leyns, Oosterzele (BE)

(73) Assignee: CropDesign N.V. (BE)

( * ) Notice: Subject to any disclaimer, the term of this patent is extended or adjusted under 35 U.S.C. 154(b) by 0 days.

(21) Appl. No.: 12/185,471

(22) Filed: Aug. 4, 2008

(65) Prior Publication Data

US 2009/0035782 A1 Feb. 5, 2009

Related U.S. Application Data

(63) Continuation of application No. 10/544,539, filed as application No. PCT/EP2004/050085 on Feb. 5, 2004.

(30) Foreign Application Priority Data

Feb. 5, 2003 (EP) ................... 03075350
Oct. 13, 2003 (EP) ................... 03103779

(51) Int. Cl.
*A01H 1/04* (2006.01)
(52) U.S. Cl. .................................. 47/58.1 R
(58) Field of Classification Search ............. 47/58.1 SE
See application file for complete search history.

(56) References Cited

U.S. PATENT DOCUMENTS

| | | | |
|---|---|---|---|
| 2,244,677 A | 6/1941 | Cornell | |
| 3,063,195 A * | 11/1962 | Ravich | ........................... 47/17 |
| 3,824,736 A | 7/1974 | Davis | |
| 4,015,366 A | 4/1977 | Hall, III | |
| 4,035,949 A | 7/1977 | Ruthner | |
| 4,481,893 A | 11/1984 | Qvarnström | |
| 4,570,380 A | 2/1986 | Ray et al. | |
| 4,628,631 A | 12/1986 | Van Wingerden | |
| 4,950,166 A | 8/1990 | Williams | |
| 5,013,658 A * | 5/1991 | Dooner et al. | ................. 435/6 |
| 5,247,761 A | 9/1993 | Miles et al. | |

(Continued)

FOREIGN PATENT DOCUMENTS

DE 39 06 215 A1 8/1990

(Continued)

OTHER PUBLICATIONS

International Search Report of PCT/EP2004/050085, mailed Aug. 30, 2004.

(Continued)

*Primary Examiner*—Francis T Palo
(74) *Attorney, Agent, or Firm*—Connolly Bove Lodge & Hutz LLP

(57) ABSTRACT

A process for breeding plants which comprises growing plants of a species in an array of containers charged with growing medium of uniform characteristics in an environment of controlled climatic conditions with controlled supply of nutrients and feed water and changing the positions of the containers within the environment as required to ensure at least substantially uniform exposure of all plants in the containers to conditions in the environment. A process for the breeding of open pollinating plants in a greenhouse environment is also provided. A process for breeding plants which comprises identifying trait leads.

31 Claims, 2 Drawing Sheets

U.S. PATENT DOCUMENTS

| | | | |
|---|---|---|---|
| 5,394,646 A | | 3/1995 | Sumiyoshi et al. |
| 5,536,901 A | * | 7/1996 | Greaves et al. ............... 800/260 |
| 5,710,367 A | * | 1/1998 | Kindiger et al. ............. 800/266 |
| 5,723,596 A | * | 3/1998 | Cramer et al. ............. 536/24.3 |
| 5,735,077 A | * | 4/1998 | Warfield, Jr. ............. 47/58.1 R |
| 5,741,684 A | * | 4/1998 | Fabijanski et al. .......... 800/267 |
| 5,750,386 A | * | 5/1998 | Conkling et al. ............ 800/279 |
| 5,764,819 A | | 6/1998 | Orr et al. |
| 5,780,709 A | * | 7/1998 | Adams et al. ............... 800/260 |
| 5,878,527 A | | 3/1999 | Valstar |
| 5,943,818 A | | 8/1999 | Fruehwirth |
| 6,164,537 A | | 12/2000 | Mariani et al. |
| 6,483,434 B1 | | 11/2002 | UmiKer |
| 6,506,964 B1 | | 1/2003 | Carolo |
| 6,701,665 B1 | | 3/2004 | Ton et al. |
| 7,403,855 B2 | | 7/2008 | Fuessley et al. |
| 7,506,472 B2 | | 3/2009 | Leyns et al. |
| 7,697,133 B2 | | 4/2010 | Leyns et al. |
| 2003/0126791 A1 | | 7/2003 | Weder |
| 2003/0174046 A1 | | 9/2003 | Abrams |
| 2004/0122592 A1 | | 6/2004 | Fuessley et al. |
| 2004/0163308 A1 | | 8/2004 | Uchiyama |
| 2004/0200146 A1 | | 10/2004 | Leyns et al. |
| 2004/0201454 A1 | | 10/2004 | Waterhouse et al. |
| 2006/0150490 A1 | | 7/2006 | Dillen et al. |
| 2007/0289211 A1 | | 12/2007 | Lejeune et al. |

FOREIGN PATENT DOCUMENTS

| | | | |
|---|---|---|---|
| DE | 42 41 950 A1 | | 5/1994 |
| DE | 19920920 A1 | * | 11/2000 |
| DE | 199 50 532 A1 | | 7/2001 |
| EP | 0 302 183 A2 | | 2/1989 |
| EP | 0 919 492 A1 | | 6/1999 |
| EP | 1 157 961 A2 | | 11/2001 |
| FR | 2709636 A1 | | 3/1995 |
| GB | 1 160 512 A1 | | 8/1969 |
| GB | 1 576 010 | | 10/1980 |
| WO | WO-02/21905 A1 | | 3/2002 |

OTHER PUBLICATIONS

CropDesign, Information from CropDesign's webpage on or around Jul. 31, 2002.

* cited by examiner

BREEDING PLANTS

RELATED APPLICATIONS

This application is a continuation of U.S. application Ser. No. 10/544,539, which is a 35 U.S.C. 371 National stage filing of International Application No. PCT/EP2004/50085, filed Feb. 5, 2004, which claims priority to European Application No. 03075350.3, filed Feb. 5, 2003 and European Application No. 03103779.9, filed Oct. 13, 2003. The entire contents of each of these applications are hereby incorporated by reference herein.

SPECIFICATION

This invention relates to breeding plants and is especially concerned with the conditions under which plants are grown during the breeding process.

Plant breeding starts in essence with the creation of genotypic variation among plants of a given species. The creation of genotypic variation relies on the production of genetic alterations that can be obtained by techniques including recombination through classical crossing, chemical mutagenesis, radiation-induced mutation, somatic hybridisation, inter-specific crossing and genetic engineering. Following the creation of genotypic variation, selection of those genotypes having the most desirable agronomic phenotypes is performed.

In plant breeding, the process of selecting those genotypes having the most desirable agronomic phenotypes is typically carried out in fields composed of several plots, each plot typically consisting of at least several square metres or of sufficient dimensions to grow at least several tens of plants. The assessment of phenotypes in a statistically sound manner requires that each genotype be grown and its phenotype assessed in several different plots, typically no less than three. Even before the field experiments may begin, the plant breeder requires enough seeds to grow the required number of plants for the experiment. Seeds of a given genotype are often only available in small quantities and therefore the generation of greater seed numbers is often required before the experiments may begin. Seed generation is typically carried out by the growing of sometimes multiple generations of plants in order to obtain the necessary seed quantities to conduct a field scale experiment.

For breeding to be successful, a sufficient number of genetic alterations has to be examined in order to identify the few amongst many that are of agronomic relevance. The procedure for selection of genotypes has to be sufficiently discriminative for detecting phenotypic differences between the different genotypes and requires as a basis a set of parameters that is sufficiently detailed as to adequately describe the observed phenotypes.

The phenotype (based for example on observations of growth habit, yield potential and resistance to stresses) is the result of contribution from the genotype itself (genotype-associated phenotype) and from the environment (environment-associated phenotype). The environment-associated phenotype is influenced by variations in the growth environment caused by variations in, for example, temperature, humidity, light, nutrient and supply. An important factor that obscures phenotype-driven selection of desired genotypes is variations in the environment-associated phenotype component. When phenotype-based breeding is performed in the field, most of the environmental variation comes from non-uniformity of the soil in which plants are grown. The soil composition, the physical properties of soil, the availability of nutrients, water and the presence of microbial suit inhabitants can vary over short distances in natural soils. One way to avoid variations due to the heterogeneity of soil is to grow plants in containers (pots, trays, of the like containing a better defined substrate, such as potting soil, vermiculite, or rock wool. Growth of plants on a defined substrate is usually done in a greenhouse, so that the amount of water and nutrients given to the plants can be controlled. Growing plants under these conditions significantly reduces environmental variation. However, even when plants are grown in a greenhouse equipped with systems for climate control (heating, cooling, aeration, humidity control systems) and nutrient/water delivery, environmental conditions still vary with geometrical locations within the greenhouse. This environmental variation can be due to differences in distance between plants and the proximity or otherwise to devices used for climate control and nutrient/water delivery, for example heating elements, cooling elements, windows, doors, misting devices, ventilators, water inlets and water outlets.

Plants grown in greenhouses are amenable to automated handlings because they are usually grown in pots that can be easily transported to and from automation devices.

When breeding open pollinating plants, such as corn, in a greenhouse environment, it is important to restrict the flow of pollen within the environment. Failure to do so could, undesirably, lead to a mixing of the various genetic characteristics present within the environment. Conventional means for the growing of corn, an open pollinating plant, in a greenhouse environment deal with the necessity to restrict pollen flow by covering the female parts of the plant. In the case of corn, each female organ (ear with extending silks) is covered with a (paper) bag so as to prevent the contacting of pollen with these parts. Pollination is then carried out in a controlled manner by removing the bags, so as to expose the female parts, and then shaking the tassel (male organs of a corn plant) in the neighbourhood of the female organs. This process generates considerable variability in pollination efficiency, not only due to the variation in quantity and quality of the pollen applied, but also due to the difficulty associated with timing the pollination event given the short window available in which the female organs are in an optimal state for pollination. There are therefore major problems associated with conventional methods for the breeding of open pollinating plants in a greenhouse environment.

BRIEF SUMMARY OF THE INVENTION

It is one object of the present invention to provide an improved process for breeding plants.

It is another object of the present invention to provide an improved process for breeding plants in which plant breeding may be conducted using smaller seed quantities than in conventional breeding processes.

It is another object of the present invention to overcome some of the aforementioned problems and to provide an improved process for the breeding of open pollinating plants in a greenhouse environment.

DETAILED DESCRIPTION OF THE INVENTION

Figure 1:
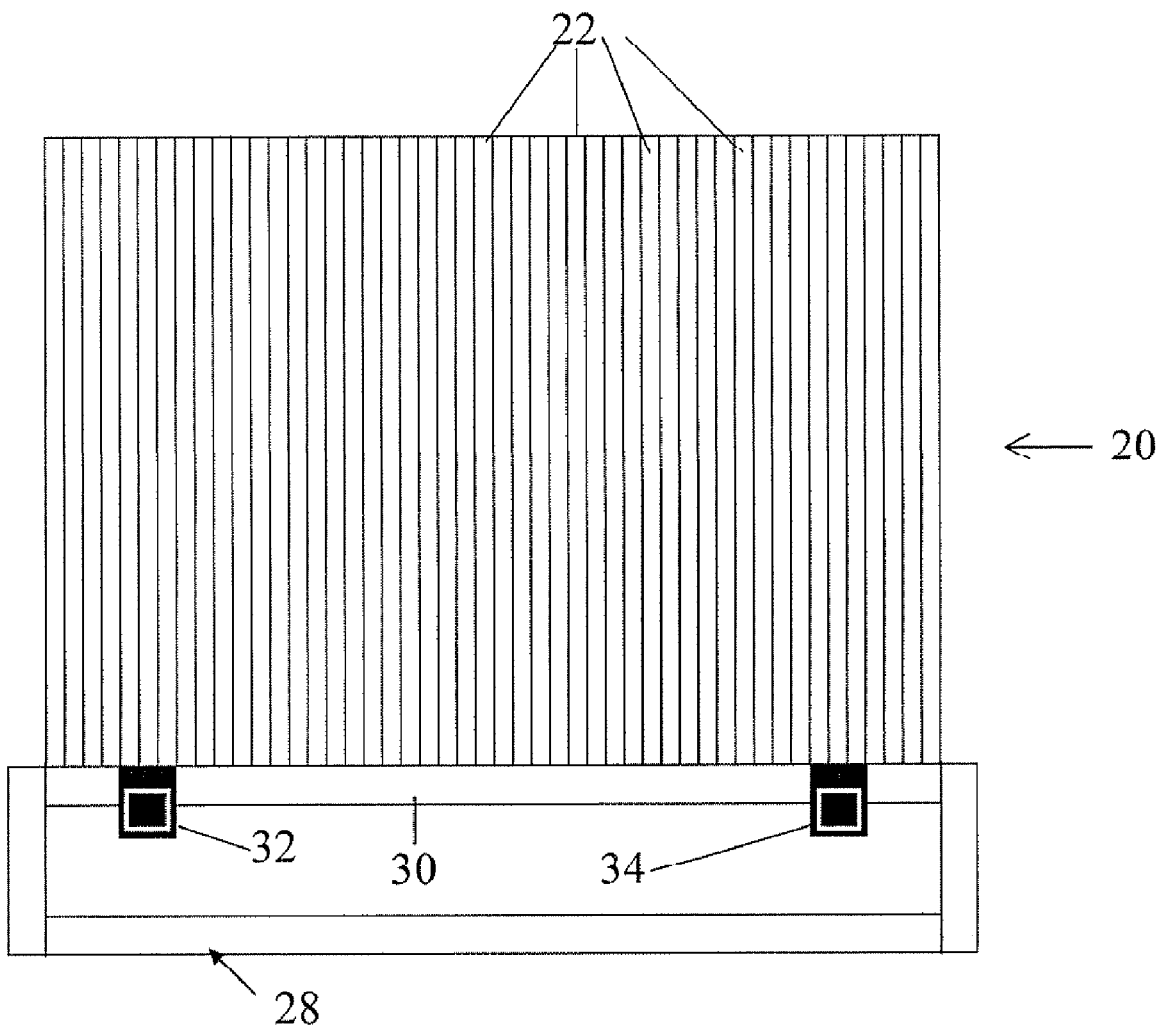
FIG. 1 is a schematic representation of transporter means of the illustrative apparatus.

We have now found that one may reduce significantly the influence of environment-associated phenotype on phenotyping results by changing the location of growing plants in a greenhouse. The influence of environment-associated phenotype on phenotyping results may be further reduced by growing the plants on a growth medium of uniform characteristics in an environment of controlled climatic conditions with a controlled supply of nutrients and feed water.

The invention therefore provides in one of its aspects a process for breeding plants which comprises growing plants of a species in an array of containers charged with growing medium of uniform characteristics in an environment of controlled climatic conditions with controlled supply of nutrients and feed water and changing the positions of the containers within the environment as required to ensure at least substantially uniform exposure of all plants in the containers to conditions in the environment. A process according to invention preferably comprises the further stop of identifying phenotype characteristics such as, growth, yield and tolerance to abiotic stress of the plants at intervals in the growing cycle. For example, plants may be evaluated visually or by use of appropriate equipment. If desired, algorithms may be used to select and evaluate the information and the results statistically analysed to identify trait leads. Preferably also, plants are selected for further breeding or for commercial use by comparing the phenotype characteristics of the plants.

The word "comprising" where used herein is intended to encompass the notion of "including" and the notion of "consisting essentially of".

In a process according to invention, the positions of the containers may be changed continuously or at intervals. In one preferred process they are changed to an extent and at intervals pre-set by an operator in accordance with observation of growth characteristics of the plants. The positions of the containers within the environment may be changed at intervals of up to two weeks, preferably from six hours to two weeks more preferably at intervals from one day to one week. Preferably the positions of the containers within the environment are changed automatically. One preferred apparatus supports an array of containers in the form of pots containing plants. Preferably there is one plant growing in each pot, although plants can be grown with several individuals in a large pot or in trays or in a tray consisting of physically connected pots.

Apparatus suitable for use in a process according to the invention preferably comprises transporter means upon which the containers are supported in a horizontally disposed uniform array. Preferably the transporter means comprises a plurality of co-extensive storage transporters each comprising a "U" shaped gutter equipped with a belt lying flat on the bottom of the gutter, and transfer conveyor means. Preferably the belts are moved in the gutters by means of motors such as electric motors. In one preferred apparatus hereinafter described, shuttle robots are provided which can position themselves in front of a particular gutter, and a motor in the robot can be activated to pull the belt in the gutter back or forth, thus allowing the transport of containers in and out of the gutters. The ends of the gutters communicate with the transfer conveyor, so that containers may be transported back and forth from gutter to gutter and back and forth to specific areas in the array. Preferably, the motors are caused to move the containers continuously or at time intervals for example intervals from six hours to two weeks more preferably at intervals of one day to one week. Thus, a storage transporter may be moved by motor means to move the row of containers supported on that storage transporter towards a first transfer station at which an endmost container of the row is transferred to the transfer conveyor means, the transfer conveyor means may be operated to move a container supported on it to a second transfer station and motor means of a second storage transporter may be operated to collect the container.

In one preferred arrangement, the transfer conveyor means is arranged so that the container is carried in a linear path from the first mentioned storage transporter to the second storage transporter. In another arrangement, the transfer conveyor means is arranged so that the container is carried in a closed path from the first mentioned storage transporter to the second storage transporter; for example a rotary table may be employed and if so, several containers may be loaded to it and removed therefrom in random order for sending to the second storage transporter.

In a process according to the invention the containers are positioned as closely together as practicable bearing in mind the volume occupied by the plant or plants in the container.

A process according to the invention has various advantages. It enables effective dampening of environmental variations that influence the phenotypes of plants and therefore interfere with the selection of desired genotype-associated phenotypes. By changing the location of plants during their life cycle they are exposed to slightly different environmental settings at each location. When the displacement of all the plants in the breeding population occurs at a sufficiently high frequency (e.g. once per day or once per week) then the spatial effects will be randomized over the population. The dampening of environmental contribution to the phenotype of plants during breeding enables desired genotypes to be selected more reliably. The step of identifying the phenotype (be it a characteristic such as growth, yield or stress tolerance) is facilitated by the changing of the location of plants. For example, where the plant phenotype is evaluated by means of appropriate equipment, the plants may be moved at appropriate intervals to the station where the equipment for evaluation is located. Also, enhanced uniformity of the growing plants allows use of a smaller plant population for study, which in return reduces costs. This allows for the breeding of various agronomic characteristics, such as yield, using a smaller plant population (typically on a green-house scale) compared to conventional methods requiring much larger plant populations (typically on a field scale) in order to accurately assess the phenotypic variation associated with different genotypes. Also, the process gives a more efficient plant breeding because, given a fixed number of genetic alterations studied, fixed level of required discriminative power, the size of the population representing a certain genetic alteration can be reduced resulting in the capacity to reliably establish phenotypes under conditions of limited availability of seeds (as is often the case in the generation following the creation of genetic alterations), as such, omitting the need for extensive seed propagation and consequent loss of time.

The advantage of being able to conduct a breeding process with smaller seed quantities than would otherwise be possible is particularly relevant in the case of breeding of transgenic plants for various desirable phenotypic characteristics (traits).

The breeding of transgenic plants involves the introduction of at least one nucleic acid into a single plant. Different plants may have the same or different nucleic acids introduced therein. Plants are then grown and evaluated to identify plants having desirable traits. Plants having such desirable traits may be further evaluated in a field environment of may be backcrossed with different varieties of inbred lines of the same crop species or may be used to generate or test hybrids or may be used for the production of seed, possibly for commercial use.

Advantageously, any plant may be subject to the breeding process of the invention. According to one aspect of the invention, the plant subject to the breeding process is a self-pollinating plant, such as rice. A self-pollinating plant is one in which, under normal conditions, the female organs of any one given plant species is pollinated by pollen produced in the male organs of that same plant species.

According to another aspect of the invention, the plant subject to the breeding process is an open pollinating plant species, such as corn. An open pollinating plant species is a plant which is substantially a non-self pollinating plant species.

The present invention also provides a process for the breeding of open pollinating plant species in a greenhouse environment. This process, which is applicable to open pollinating plants, is preferably used in conjunction with the process for breeding plants described hereinabove. Advantageously, the process for the breeding of open pollinating plants removes the variability in pollination efficiency associated with conventional methods for the breeding of open pollinating plants, such as corn, in a greenhouse environment. A further advantage of this process is that the problem of the mixing of genotypes, associated with conventional methods, is avoided.

Therefore according to the present invention, there is provided a process for the breeding of open pollinating plants in a greenhouse environment, comprising the steps of:

(i) providing a male sterile open pollinating plant;
(ii) contacting the male sterile plant with pollen; and optionally
(iii) selecting plants having a desired phenotype The aforementioned process is particularly applicable to the breeding of open pollinating plants, in particular corn. In the process of the invention, pollination is made more efficient, and the mixing of genotypes avoided, by rendering the plants subject to the breeding process male sterile. This substantially eliminates any self pollination which may occur and further substantially eliminates the mixing of genotypes within the population of plants. Methods for rendering plants male sterile are well known in the art and include chemical or mechanical techniques. An example of a mechanical technique for rendering plants male sterile simply involves the physical removal of male parts (emasculation). An example of a chemical technique for rendering plants male sterile involves the use of chemical hybridising agents or CHAs.

The process comprises the further step of contacting the male sterile plants with pollen. This is carried out by the introduction of male sterile plants to a pollination chamber in which male sterile plants are grown for a period ranging from about 2 days to about 3 weeks, preferably from between about 3 days and about 10 days. The introduction of male sterile plants into the pollination chamber coincides with a period of female fertility. A person skilled in the art will readily recognise the period of female fertility and thus will be well aware of the point in time for the introduction of the male sterile plants to the pollination chamber and the time required for maintenance of the male sterile plants in the pollination chamber. The pollination chamber comprises a number of pollinator (pollen shedding) plants. Male sterile plants, upon introduction into the pollination chamber, are grown for a period of time with pollinator plants of a single variety of the same species, most preferably of the same variety as the male sterile plants. In order to optimise contacting of pollen with the male sterile plants, pollinator plants are interspersed between male sterile plants. In one arrangement, a row of pollinator plants is provided followed by a row of male sterile plants followed by another row of pollinator plants and so on. Alternatively, one pollinator plant may be placed next to a male sterile plant so as to fill all rows in a crisscross formation. The pollination chamber may be arranged such that it is physically or spatially separate from the location where the male sterile plants grow in times outside of female fertility. The pollination chamber is equipped with a controlled environment (climatic or otherwise) optimal for pollination and depending upon the requirements of the cross pollinating species to which the process is applied. By way of example, for corn, the controlled climatic conditions comprise a temperature of between about 20° C. and about 35° C., preferably between about 24° C. and about 30° C. and a relative humidity of between about 70% and about 90%. Furthermore, since corn is pollinated principally with the aid of wind, the pollination chamber is equipped with means to promote circulation of air and therefore pollen throughout the chamber. Fertilisation of plants is further aided by provision of a pollination chamber of such dimensions so as to create a sufficient concentration of pollen to promote fertilisation.

The process optionally comprises the further step of selection of plants for any given characteristic. This may be selection based on the presence of a particular phenotype or may be selection of plants having appropriate dimensions to fit, say, the transporter means or to be of an appropriate height to be suitable for a greenhouse environment, for example taking into account the proximity of the plants to the lights etc. With regard to corn, there are particular advantages associated with the use of plants which are relatively small or short and which have a comparatively short cycle time, preferably about four months or less. These plants may be different varieties, hybrids, an inbred or a population, such as Gaspe or any inbred line derived from Gaspe e.g. through a number of generations of selfing.

Figure 2:
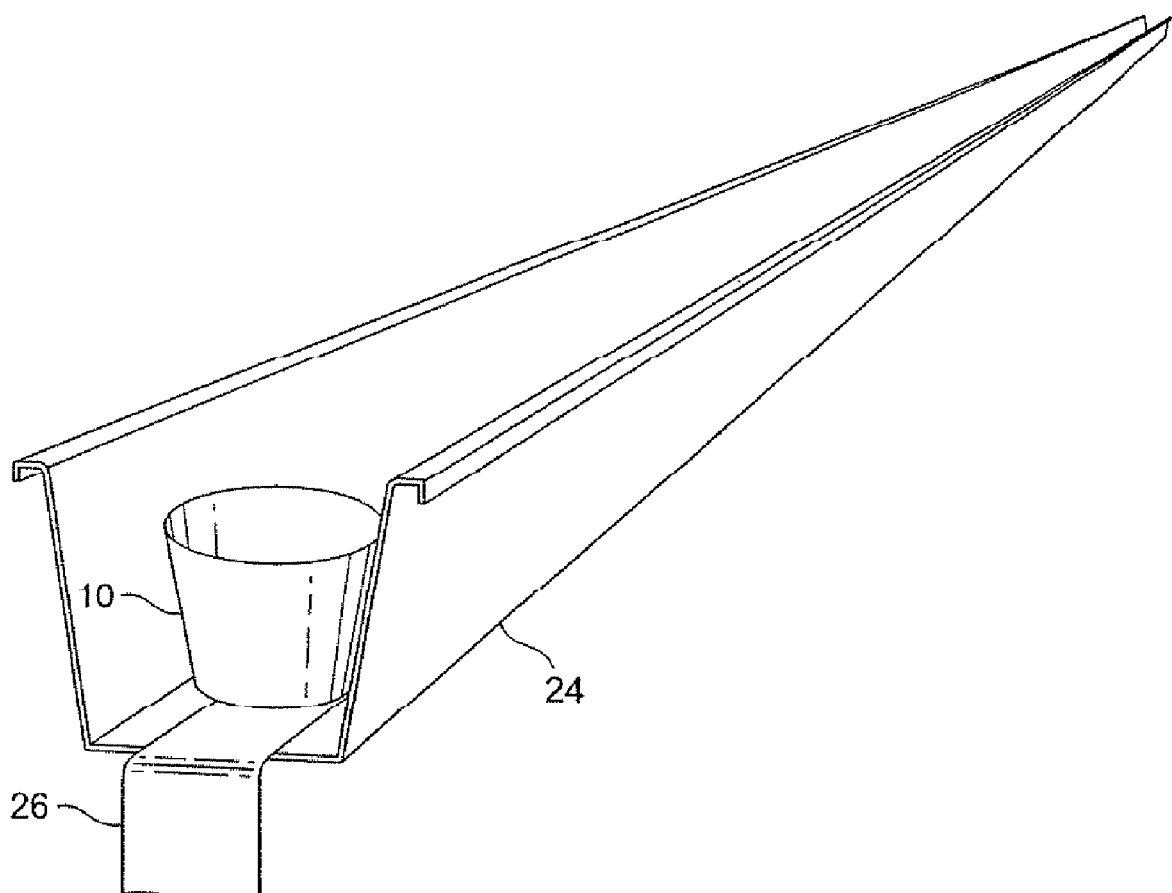
FIG. 2 is a view in perspective of a channel member and conveyor belt of the transporter means supporting a plant pot.

In order that the invention may become more clear there now follows a description to be read with the accompanying drawings of apparatus for use in a preferred process according to the invention selected for description to illustrate the invention by way of example. In the drawings, FIG. 1 is a schematic representation of transporter means of the illustrative apparatus; and FIG. 2 is a view in perspective of a channel member and conveyor belt of the transporter means supporting a plant pot.

The illustrative apparatus is suitable for use in conjunction with a plurality of containers in the form of plant pots (10) (FIG. 2) in which one or more plants is growing in a medium selected for the purpose.

The apparatus comprises transporter means (20) by which the pots are supported and moved as desired. The transporter means (20) comprises a plurality of co-extensive storage transporters (22) each providing support for a row of several pots, the storage transporters being disposed adjacent one another to support rows of pots in a horizontally disposed array. Each storage transporter (22) comprises a channel member provided by a rigid "U"-shaped gutter (24) secured in parallel relation next to adjacent gutters. An endless belt (26) operates within each gutter (FIG. 2) and is located with an upper surface lying in the gutter and arranged to be drawn along it. Each belt (26) supports a row of closely spaced pots (10). The gutters (24) are situated with their end portions proximate to a belt conveyor (30) of transfer conveyor means (28) located transversely to the gutters (24).

Electrically operated shuttle robots (32, 34) are employed to actuate movement of the belts (26) in the gutters (24). The movement causes the pots to be transported to or from the belt conveyor (30). Motor means is provided for moving the belt conveyor (30) continuously. When a belt (26) is moved in its gutter in one direction, the row of pots supported on that belt is moved towards a transfer station at which an endmost pot of the row is transferred to the belt conveyor (30). When moved in the other direction the belt (26) moves the row of pots supported on that belt away from the belt conveyor (30), allowing space for a pot to be introduced to the end of that row. Each shuttle robot (32, 34) is arranged for movement along the belt conveyor (30) so that it may communicate with the gutters individually as desired. They are of similar construction and comprise guide members (not shown) for guiding pots moving along the belt conveyor (30). A cylinder of a pneumatically operated piston and cylinder device (not shown) is mounted on the shuttle robot between the guide members and its piston is arranged for movement horizontally across and above the belt conveyor (30). In its rest position, the piston serves to arrest a pot delivered from a gutter by its belt (26). When it is desired to remove a pot from the belt conveyor (30), the piston is actuated to push the pot and urge it into the selected gutter (22).

Historical positional data combined with fertiliser and watering data enables an operator of the apparatus to keep track of the nutritional regime of every single plant in the array. The information also enables the operator to schedule all plant movements in the most efficient way.

The apparatus is arranged so that the shuttle robots are actuated in response to data contained in the database so as to move a pot from one location to another.

The invention claimed is:

1. A method for the efficient analysis of the effect of a gene of interest on a selected phenotypic parameter in a plant, the method comprising:
 a) providing a population of plants grown in an environmentally controlled greenhouse environment;
 b) providing a device for evaluation of the phenotypic parameter;
 c) using the evaluation device to obtain information on the phenotypic parameter for each plant and then select and evaluate the information for the phenotypic parameter in each plant;
 d) comparing the phenotypic parameter of the plants; and
 e) statistically analyzing the differences for the phenotypic parameter between plants to identify trait leads.

2. The method of claim 1, wherein the plant is a transgenic plant.

3. The method of claim 1, wherein the plant is corn or rice.

4. The method of claim 3, wherein the corn is a fast cycling corn line.

5. The method of claim 4, wherein the corn is Gaspe.

6. The method of claim 1, wherein each plant within the population of plants is associated with information about the plant's identity and greenhouse location.

7. The method of claim 1, wherein the selected phenotypic parameter is a yield component trait or a stress tolerance trait.

8. The method of claim 7, wherein the yield component trait is growth or yield.

9. The method of claim 1 in which the plants are transported on a conveyor system through a station with the evaluation equipment.

10. A method for the efficient analysis of a trait in transgenic plants, the method comprising:
 a) providing recipient plant cells from a plant line for transformation;
 b) obtaining a plurality of nucleotide vectors;
 c) introducing the plurality of nucleotide vectors into the recipient plant cells to create a plurality of transgenic plants;
 d) allowing the plurality of transgenic plants to grow in an environmentally controlled greenhouse environment,
 e) analyzing each transgenic plant for the trait by visual evaluation or by use of appropriate equipment; and
 f) comparing the trait for the transgenic plants to determine the effect of the nucleotide vectors on the trait.

11. The method of claim 10, wherein the trait is a yield, growth, or a stress tolerance trait.

12. The method of claim 10, wherein the plant line that is the source of recipient plant cells is corn or rice.

13. The method of claim 12, wherein the corn is a fast cycling corn line.

14. The method of claim 13, wherein the corn is Gaspe.

15. The method of claim 10 in which the plants are transported on a conveyor system through a station with the evaluation equipment.

16. A method for the efficient analysis of the effect of a gene of interest on a selected phenotypic parameter in plants, the method comprising the steps of:
 a) providing a population of transgenic plants possessing the gene of interest and grown in an environmentally controlled greenhouse environment;
 b) using an analyzing device to take and evaluate information on each plant and then analyze the information to obtain phenotypic data for each plant; and
 c) performing a statistical analysis of the phenotypic data to analyze the effect of the gene of interest on the selected phenotypic parameter.

17. The method of claim 16, wherein the plant is corn or rice.

18. The method of claim 17, wherein the corn is a fast cycling corn line.

19. The method of claim 18, wherein the corn is Gaspe.

20. The method of claim 16 including as a first step introducing a transgene construct possessing at least one gene of interest into recipient plant cells to produce a population of transgenic plants.

21. The method of claim 20, wherein the plants cells are from corn or rice.

22. The method of claim 16, wherein the statistical analysis comprises the step of:
 a) comparing the phenotypic parameter for the population of transgenic plants;
 b) statistically analyzing the differences between transgenic plants for the phenotypic parameter; and
 c) identifying trait leads.

23. The method of claim 16, wherein each plant within the population of plants is associated with information about the plant's identity and greenhouse location.

24. The method of claim 16, wherein the selected phenotypic parameter is a yield component trait or a stress tolerance trait.

25. The method of claim 24, wherein the yield component trait is growth or yield.

26. The method of claim 16 in which the plants are transported on a conveyor system through a station with the evaluation equipment.

27. The method of claim 16, further comprising providing a plurality of plants and comparing the phenotypic parameter for a single member of the population of transgenic plants with the phenotypic parameter of the plurality of plants obtained by the analyzing device.

28. A method for the rapid analysis of the effect of a gene of interest on a selected phenotypic parameter in plants, the method comprising:

a) providing a population of transgenic plants possessing the gene of interest and grown in an environmentally controlled greenhouse environment;

b) pollinating the transgenic plant with the same variety of plant;

c) assaying the plants to identify plants possessing the gene of interest;

d) using an analyzing device to take and evaluate information on each plant and then analyze the information to obtain phenotypic data for each plant; and e) performing a statistical analysis of the phenotypic data to analyze the effect of the gene of interest on the selected phenotypic parameter.

29. The method of claim 28, wherein the plant is corn.

30. The method of claim 29, wherein the corn is a fast cycling corn line.

31. The method of claim 30, wherein the corn is Gaspe.

* * * * *